United States Patent
Xu et al.

(10) Patent No.: US 11,328,180 B2
(45) Date of Patent: May 10, 2022

(54) METHOD FOR UPDATING NEURAL NETWORK AND ELECTRONIC DEVICE

(71) Applicant: Beijing Horizon Robotics Technology Research and Development Co., Ltd., Beijing (CN)

(72) Inventors: Yonghao Xu, Beijing (CN); Qian Zhang, Beijing (CN); Guoli Wang, Beijing (CN); Chang Huang, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 199 days.

(21) Appl. No.: 16/666,631

(22) Filed: Oct. 29, 2019

(65) Prior Publication Data

US 2020/0134380 A1 Apr. 30, 2020

(30) Foreign Application Priority Data

Oct. 30, 2018 (CN) .......................... 201811277565.9

(51) Int. Cl.
*G06K 9/62* (2022.01)
*G06N 3/04* (2006.01)
*G06N 3/08* (2006.01)

(52) U.S. Cl.
CPC ......... *G06K 9/6259* (2013.01); *G06N 3/0454* (2013.01); *G06N 3/08* (2013.01)

(58) Field of Classification Search
CPC ............. G06K 9/6259; G06K 9/00791; G06K 9/4671; G06K 9/4628; G06N 3/0454;
(Continued)

(56) References Cited

U.S. PATENT DOCUMENTS

2005/0078881 A1* 4/2005 Xu .......................... G06T 7/337
382/294
2009/0251594 A1* 10/2009 Hua ..................... H04N 7/0122
348/441
(Continued)

FOREIGN PATENT DOCUMENTS

| CN | 104157290 A | 11/2014 |
|---|---|---|
| CN | 105631479 A | 6/2016 |

(Continued)

OTHER PUBLICATIONS

First Office Action in counterpart Chinese Patent Application No. 201811277565.9, dated Jun. 2, 2020.

*Primary Examiner* — John W Lee
(74) *Attorney, Agent, or Firm* — Westbridge IP LLC

(57) ABSTRACT

Disclosed are a method for updating a neural network and an electronic device. The method includes: inputting a first image set having tag information into a first depth neural network, and determining a cross entropy loss value of the first image set by using the first depth neural network; inputting a second image set having no tag information separately into the first depth neural network and a second depth neural network, and determining a consistency loss value of the second image set, the first depth neural network and the second depth neural network having the same network structure; updating parameters of the first depth neural network based on the cross entropy loss value and the consistency loss value; and updating parameters of the second depth neural network based on the updated parameters of the first depth neural network.

20 Claims, 6 Drawing Sheets

(58) Field of Classification Search
CPC ........ G06N 3/08; G06N 3/0481; G06N 3/088; G06N 3/084; G06N 3/082
See application file for complete search history.

(56) References Cited

U.S. PATENT DOCUMENTS

| | | | | |
|---|---|---|---|---|
| 2012/0331025 | A1* | 12/2012 | Gemulla | G06F 17/11 708/200 |
| 2014/0288928 | A1 | 9/2014 | Penn et al. | |
| 2015/0363641 | A1* | 12/2015 | Navulur | G06K 9/40 382/113 |
| 2017/0220903 | A1* | 8/2017 | Hertzmann | G06K 9/66 |
| 2018/0137611 | A1* | 5/2018 | Kwon | G06T 3/0093 |
| 2018/0285689 | A1* | 10/2018 | Mei | G06K 9/6256 |
| 2019/0066281 | A1* | 2/2019 | Zheng | G06N 3/0454 |

FOREIGN PATENT DOCUMENTS

| | | |
|---|---|---|
| CN | 106599797 A | 4/2017 |
| CN | 107122809 A | 9/2017 |
| CN | 107291837 A | 10/2017 |
| CN | 107316307 A | 11/2017 |
| CN | 107578453 A | 1/2018 |
| CN | 107748858 A | 3/2018 |
| CN | 107818314 A | 3/2018 |
| CN | 108090472 A | 5/2018 |
| CN | 108108806 A | 6/2018 |
| CN | 108154222 A | 6/2018 |
| CN | 108228686 A | 6/2018 |
| CN | 108256571 A | 7/2018 |
| CN | 108334934 A | 7/2018 |
| CN | 108540338 A | 9/2018 |
| CN | 108549926 A | 9/2018 |
| CN | 108573491 A | 9/2018 |
| CN | 108616470 A | 10/2018 |
| CN | 108664893 A | 10/2018 |

* cited by examiner

METHOD FOR UPDATING NEURAL NETWORK AND ELECTRONIC DEVICE

CROSS-REFERENCE TO RELATED APPLICATION

This application claims priority to Chinese Patent Application Serial No. 201811277565.9, filed on Oct. 30, 2018, the entire contents of which are incorporated herein by reference for all purposes.

TECHNICAL FIELD

The present application relates to the field of deep learning and neural network technologies, in particular to a method for updating a neural network and an electronic device.

BACKGROUND

At present, deep learning and neural networks have been widely used in fields of computer vision, natural language processing, and speech signal processing. In addition, the deep learning and the neural networks have also shown a level close to or beyond humans in the fields of image classification, object detection, semantic segmentation, and text translation.

The image semantic segmentation is the basis of research on applications such as unmanned driving. Existing methods of the image semantic segmentation based on the deep learning and the neural networks often require a large number of pixel level annotation samples for training, while the acquisition of the pixel level annotation samples is very time-consuming and laborious, which greatly improves the implementation cost of an algorithm. On the other hand, road scenes in different cities tend to be very different. The difference between one scene and another scene makes the previously trained model difficult to obtain a better segmentation effect in a new urban scene.

Therefore, it is expected to provide an improved scheme for updating the neural network.

SUMMARY

In order to solve the above technical problems, the present application has been made. Embodiments of the present application provide a method for updating a neural network and an electronic device, which may achieve domain adaptation between an image set having tag information and an image set having no tag information by integrating a first depth neural network and a second depth neural network with the same structure.

According to an aspect of the present application, a method for updating a neural network is provided, including: inputting a first image set having tag information into a first depth neural network, and determining a cross entropy loss value of the first image set by using the first depth neural network; inputting a second image set having no tag information separately into the first depth neural network and a second depth neural network, and determining a consistency loss value of the second image set, the first depth neural network and the second depth neural network having the same network structure; updating parameters of the first depth neural network based on the cross entropy loss value and the consistency loss value; and updating parameters of the second depth neural network based on the updated parameters of the first depth neural network.

According to another aspect of the present application, a device for updating a neural network is provided, including: a first calculating unit, configured to input a first image set having tag information into a first depth neural network, and determine a cross entropy loss value of the first image set by using the first depth neural network; a second calculating unit, configured to input a second image set having no tag information separately into the first depth neural network and a second depth neural network, and determine a consistency loss value of the second image set, the first depth neural network and the second depth neural network having the same network structure; a first updating unit, configured to update parameters of the first depth neural network based on the cross entropy loss value and the consistency loss value; and a second updating unit, configured to update parameters of the second depth neural network based on the updated parameters of the first depth neural network.

According to still another aspect of the present application, an electronic device is provided, including: a processor; and a memory on which a computer program instruction is stored. When the computer program instruction is executed by the processor, the processor performs the method for updating the neural network described above.

According to yet still another aspect of the present application, a computer readable medium is provided; a computer program instruction is stored on the computer readable medium. When the computer program is executed by a processor, the processor performs the method for updating the neural network described above.

Compared with the prior art, in the method for updating the neural network, the device thereof and the electronic device provided by the present application, a first image set having tag information is input into a first depth neural network, and a cross entropy loss value of the first image set is determined by using the first depth neural network; a second image set having no tag information is separately input into the first depth neural network and a second depth neural network, a consistency loss value of the second image set is determined, and the first depth neural network and the second depth neural network have the same network structure; parameters of the first depth neural network is updated based on the cross entropy loss value and the consistency loss value; and parameters of the second depth neural network is updated based on an updated parameters of the first depth neural network.

In this way, by integrating the first depth neural network and the second depth neural network, both of which having the same structure, the domain adaptation between the image set having the tag information and the image set having no tag information can be realized, so that the image set having the tag information can be used for updating neural networks with different depths, which can reduce the cost for labeling the image set having no tag information.

BRIEF DESCRIPTION OF DRAWINGS

The above and other objects, features and advantages of the present application will become more apparent through a more detailed description of the embodiments of the present application in combination with accompanying drawings. The accompanying drawings are intended to provide a further understanding of the embodiments of the present application and form a part of the specification. In the accompanying drawings, the same reference marks generally refer to the same parts or steps.

DETAILED DESCRIPTION OF THE EMBODIMENTS

Figure 1:
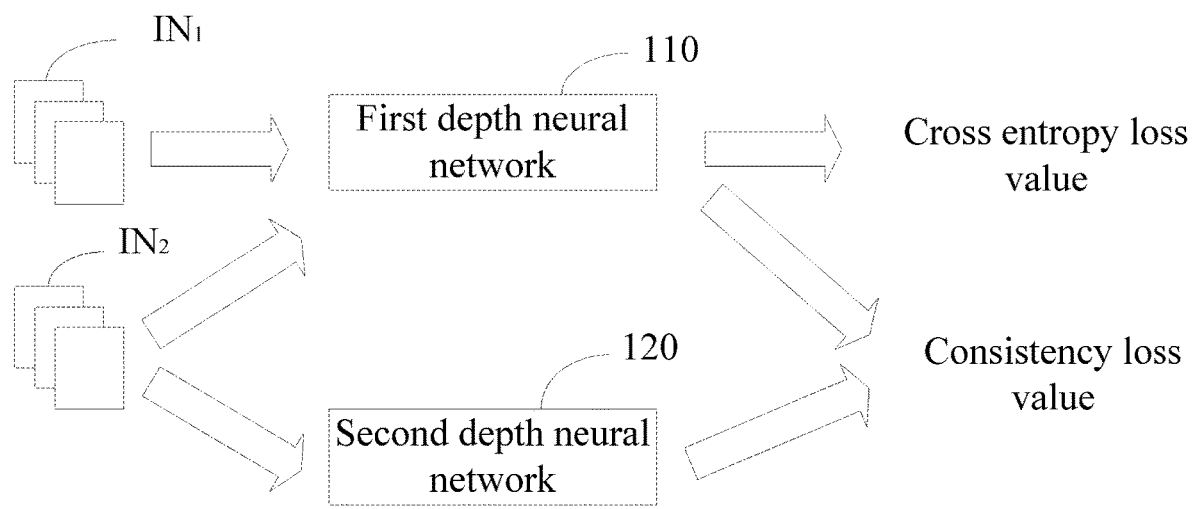
FIG. 1 illustrates an application scene diagram of a method for updating a neural network according to an embodiment of the present application.

Hereinafter, exemplary embodiments according to the present application will be described in detail with reference to the accompanying drawings. It is apparent that the described embodiments are only a part of the embodiments of the present application, rather than all the embodiments of the present application. It should be understood that the present application is not limited by the exemplary embodiments described herein.

Application Overview

As described above, as for the change of the scene applied to a neural network, an anti-learning method is mainly adopted to make a depth network simultaneously learn source domain (i.e., a data set having tag information) and target domain (i.e., a data set having data but having no tag information), and further make the network unable distinguish whether the data is input from the source domain or the target domain, thereby reducing feature differences between different domains.

However, training of an anti-learning model is usually very difficult. Relevant hyperparameters in the network, such as a learning rate and a weight of an anti-loss function, etc., have a great influence on the effect of the model, and may result in mode collapse, so the training is very time-consuming and laborious.

To solve the above technical problems, a basic idea of the present application is to integrate a first depth neural network and a second depth neural network, both of which having the same network structure, to form a self-integrating model. In a training process of the self-integration model, parameters of the first depth neural network, in which a data set having tag information is input, is first updated, and then parameters of the second depth neural network, in which a data set having no tag information is input, is further updated based on the updated parameters of the first depth neural network.

Specifically, in the method for updating the neural network, the device thereof and the electronic device provided by the present application, a first image set having tag information is input into a first depth neural network, and a cross entropy loss value of the first image set is determined by using the first depth neural network; a second image set having no tag information is separately input into the first depth neural network and a second depth neural network, a consistency loss value of the second image set is determined, and the first depth neural network and the second depth neural network have the same network structure; parameters of the first depth neural network is updated based on the cross entropy loss value and the consistency loss value; and parameters of the second depth neural network is updated based on an updated parameters of the first depth neural network.

In this way, by integrating the first depth neural network and the second depth neural network, both of which having the same structure, the domain adaptation between the image set having the tag information and the image set having no tag information can be realized, so that the image set having the tag information can be used for updating neural networks with different depths, which can reduce the cost for labeling the image set having no tag information.

Herein, those skilled in the art may understand that, in addition to image semantic segmentation, the depth neural network in the embodiments of the present application may also be applied to other cross-domain learning application scenes for data sets having tag information or having no tag information, such as object detection, etc., which is not limited in the embodiments of the present application.

After introducing the basic principles of the present application, various non-limiting embodiments of the present application will be described in detail with reference to the accompanying drawings.

Exemplary Systems

FIG. 1 illustrates an application scene diagram of a method for updating a neural network according to an embodiment of the present application.

As shown in FIG. 1, in the embodiment of the present application, a first image set $IN_1$ having tag information, i.e., an image in the source domain, is input into a first depth neural network 110, so that a cross entropy loss value of the first image set $IN_1$ is determined by using the first depth neural network 110. Herein, since the image set having the tag information is input into the first depth neural network 110, the first depth neural network 110 may also be referred to as a "student network".

With continued reference to FIG. 1, a second image set $IN_2$ having no tag information, i.e., an image in the target domain, is separately input into the first depth neural network 110 and a second depth neural network 120, and a consistency loss value of the second image set $IN_2$ for the first depth neural network 110 and the second depth neural network 120 is determined. Herein, the first depth neural network 110 and the second depth neural network 120 have the same network structure. Since the second image set having no tag information is input into the second depth neural network 120, the second depth neural network 120 may also be called a "teacher network".

Afterwards, parameters of the first depth neural network 110 is updated based on the cross entropy loss value and the consistency loss value, and parameters of the second depth neural network 120 is updated based on the updated parameters of the first depth neural network 110. In this way, after the updating of the second depth neural network 120 ends, the second depth neural network 120 can also implement desired functions based on the input second image set $IN_2$ having no tag information, such as image semantic segmentation, image classification, object detection, etc.

Hereinafter, methods for updating a neural network according to embodiments of the present application are further explained.

Exemplary Methods

Figure 2:
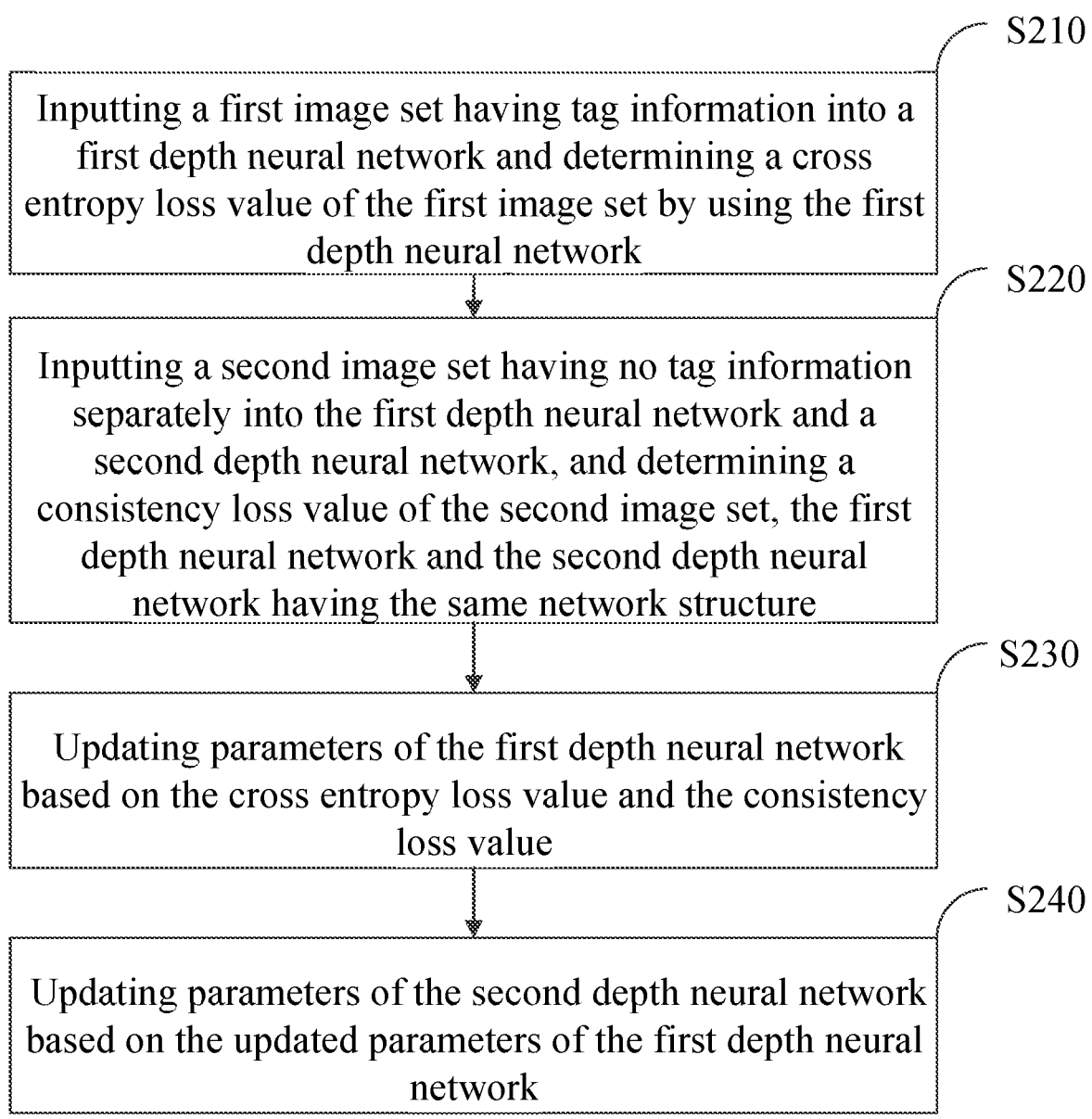
FIG. 2 illustrates a flow chart of a method for updating a neural network according to an embodiment of the present application.

FIG. 2 illustrates a flow chart of a method for updating a neural network according to an embodiment of the present application. The updating method in FIG. 2 is implemented by a processor (e.g., GPU or CPU) of a computing device.

As shown in FIG. 2, the method for updating the neural network according to an embodiment of the present application includes the following steps.

Step S210, inputting a first image set having tag information into a first depth neural network and determining a cross entropy loss value of the first image set by using the first depth neural network.

The tag information of the first image set may be previously obtained by labeling, and may represent image categories, image semantics, and the like. Moreover, the first depth neural network may be anyone of various types of depth neural networks for image semantic segmentation and the like, such as a DeepLab-V2 model and the like.

Step S220, inputting a second image set having no tag information separately into the first depth neural network and a second depth neural network, and determining a consistency loss value of the second image set, the first depth neural network and the second depth neural network having the same network structure.

The second image set having no tag information is an image set that requires the second depth neural network to perform functions such as the image semantic segmentation. For example, the second image set may include images in different scenes, such as road scenes in different cities. Moreover, the second depth neural network may also be anyone of various types of depth neural networks for the image semantic segmentation and the like, such as the DeepLab-V2 model, etc., and has the completely same network structure as the first depth neural network.

Network parameters of the first depth neural network and the second depth neural network may be initialized before the first depth neural network and the second depth neural network receive the first image set or the second image set.

Before inputting the first image set or the second image set into the first depth neural network and the second depth neural network, each image in the first image set and the second image set may be randomly augmented to improve generalization ability of the depth neural network. For example, Gaussian noise with a mean value of 0 and a standard deviation of 0.1 may be added to each pixel of each image in the first image set and the second image set to perform the random augment.

Step S230, updating parameters of the first depth neural network based on the cross entropy loss value and the consistency loss value.

Based on the cross entropy loss value and the consistency loss value, the first depth neural network may be trained in various ways to update the parameters of the first depth neural network. In an embodiment, the parameters of the first depth neural network may be updated by using a gradient descent method based on a weighted sum of the cross entropy loss value and the consistency loss value.

Specifically, the parameters of the first depth neural network is updated in a back-propagation manner by using the gradient descent method so that the weighted sum of the cross entropy loss value and the consistency loss value is reduced. When the weighted sum is reduced to zero, the first depth neural network is considered to be completely updated. The first depth neural network can be effectively trained in this way, so that the first depth neural network can implement desired functions, such as image semantic segmentation, image classification, object detection, etc., based on the first image set.

Step S240, updating parameters of the second depth neural network based on the updated parameters of the first depth neural network.

Similarly, based on the updated parameters of the first depth neural network, the second depth neural network may be trained in various ways to update the parameters of the second depth neural network. In an embodiment, the parameters of the second depth neural network may be updated by using an exponential moving average method based on the updated parameters of the first depth neural network.

Specifically, assuming the updated parameters of the first depth neural network is $\theta_s$ and the parameters of the second depth neural network before being updated is $\theta_t$, an updated parameter $\theta_{t+1}$ of the second depth neural network can be expressed as follows:

$$\theta_{t+1} = \alpha \theta_t + (1-\alpha)\theta_s$$

Here, $\alpha$ represents a weight of each updating round. Since $\alpha$ will appear in an exponential form in an iterative updating process, the method is called the exponential moving average method. Thus, by using such a manner, the second depth neural network can be synchronously updated effectively based on the updating of the first depth neural network, so that the second depth neural network can implement desired functions based on the second image set, such as image semantic segmentation, image classification, object detection, etc.

In addition, as described above, in the embodiment of the present application, the parameters of the first depth neural network may be updated in an iterative manner, i.e., the above steps S210 to S240 are performed in the iterative manner, and it is determined whether the iteration converges. When the iteration does not converge, the process returns to step S210 to continue the iteration, and when the iteration converges, the second image set is input into the second depth neural network to implement the desired functions.

In other words, after step S240 in the embodiment shown in FIG. 2, the method may further include: determining whether the updated parameters of the second depth neural network are converged with respect to the parameters of the second depth neural network before being updated; and if the updated parameters of the second depth neural network are converged with the parameters of the second depth neural network before being updated, setting an image semantic segmentation model by using the second depth neural network which has been updated.

Therefore, as for tasks for image semantic segmentation, in an embodiment, a trained second depth neural network can directly perform the image semantic segmentation based on the second image set having no tag information, thereby the trained second depth neural network can be used as the image semantic segmentation model. Thus, the image semantic segmentation model obtained by the embodiment of the present application can perform the image semantic segmentation based on the image set having no tag information, thereby eliminating the cost of manually labeling the image.

Therefore, the updated second depth neural network may implement required functions based on the second image set having no tag information, such as image semantic segmentation, etc., thereby realizing domain adaptation between the image set having the tag information and the image set having no tag information. Thus, even if an input image set does not have the tag information, the input image set can also be applied to the depth neural network to implement the required functions, thereby reducing the cost of labeling the image set.

Moreover, compared with an anti-learning method, the risk of mode collapse and the like in the anti-learning model can be avoided, so the training of the method for updating the neural network in the embodiments of the present application is more robust and the effect of adaptation is better.

In addition, inter-domain differences corresponding to different regions in the image tend to be different. For example, sky scenes in different cities tend to be similar, but road regions are more different. Therefore, specific learning regarding the inter-domain differences corresponding to different regions in the image can be realized.

In another embodiment, either of the first depth neural network and the second depth neural network may include an attention mechanism module, so that domain differences corresponding to different regions in the image can be considered, which makes the domain adaptive learning more targeted.

Figure 3:
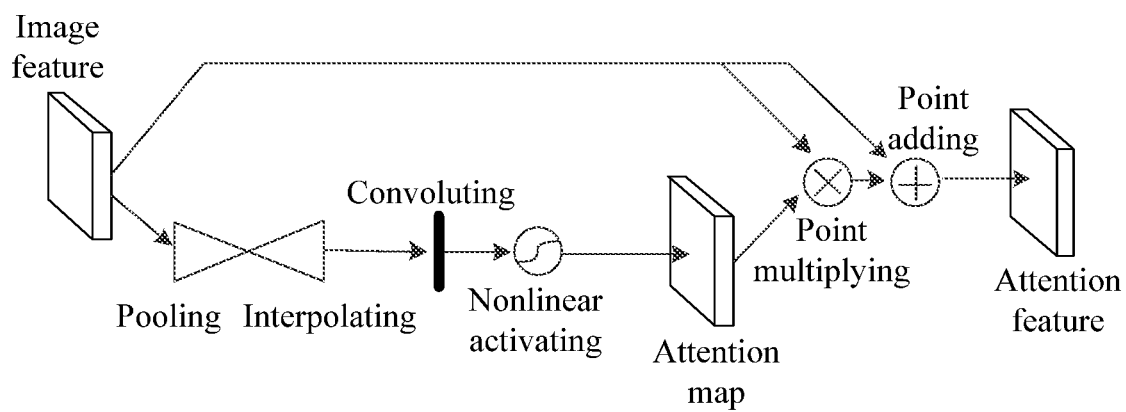
FIG. 3 illustrates a schematic diagram of an attention mechanism module according to an embodiment of the present application.

FIG. 3 illustrates a schematic diagram of an attention mechanism module according to an embodiment of the present application. As shown in FIG. 3, the attention mechanism module performs operations, such as pooling, interpolating, convoluting, and nonlinear activating, on an image feature to obtain an attention map. Then, the attention map and the input image feature are point multiplied and point added to obtain an attention feature.

In other words, an attention chart shown in FIG. 3, marked as A(x) for example, may be expressed as follows:

$$A(x)=T(U(D(F(x))))$$

Here, $F(x)$ is the input image feature, D represents the pooling operation, such as 2×2 pooling operation, U represents the interpolating operation, such as bilinear interpolating operation, and T represents the convoluting operation, such as 1×1 convoluting operation and nonlinear activating operation.

In addition, the attention feature shown in FIG. 3, marked as H(x), for example, may be expressed as follows:

$$H(x)=(1+A(x))*F(x)$$

Hereinafter, specific applications of the attention mechanism module in the embodiments of the present application are described in detail with reference to FIG. 4 and FIG. 5.

Figure 4:
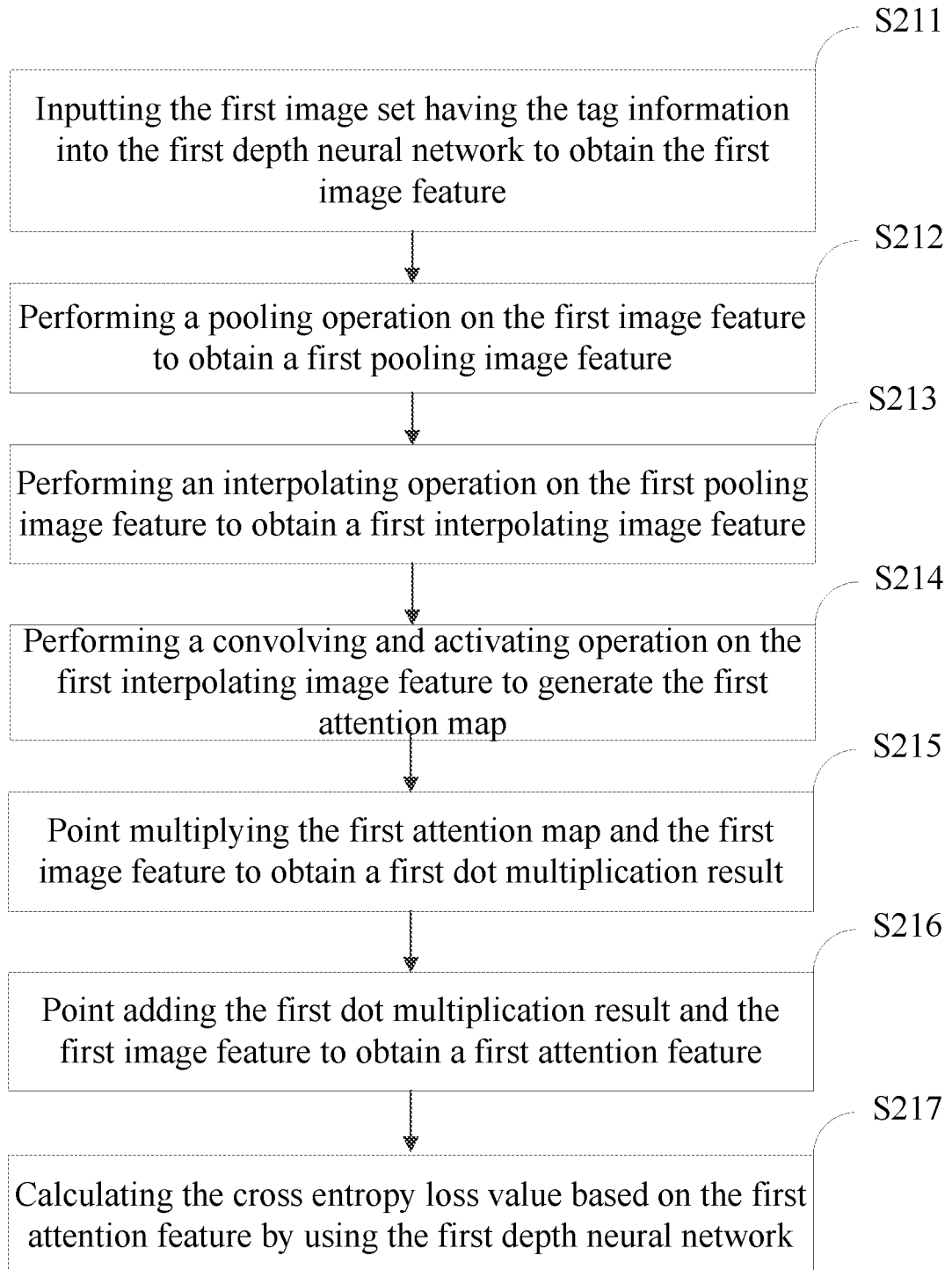
FIG. 4 illustrates a flow chart for determining a cross entropy loss value of a first image set by using a first depth neural network with an attention mechanism according to an embodiment of the present application.

FIG. 4 illustrates a flow chart for determining a cross entropy loss value of a first image set by using a first depth neural network with an attention mechanism according to an embodiment of the present application. As shown in FIG. 4, on the basis of the embodiment shown in FIG. 2 above, step S210 may include the following steps.

S211: inputting the first image set having the tag information into the first depth neural network to obtain the first image feature. For example, the first image feature obtained is recorded as $F_1(x)$.

S212: performing a pooling operation on the first image feature to obtain a first pooling image feature. For example, D represents the pooling operation, such as 2×2 average pooling operation, the first pooling image feature $D(F_1(x))$ is obtained.

S213: performing an interpolating operation on the first pooling image feature to obtain a first interpolation image feature. For example, U represents the interpolating operation, such as the bilinear interpolation operation, the first interpolation image feature $U(D(F_1(x)))$ is obtained.

S214: performing a convolving and activating operation on the first interpolation image feature to generate the first attention map. For example, T represents the convoluting and activating operation, such as the 1×1 convoluting and sigmoid nonlinear activating operation, the first attention map $T(U(D(F_1(x))))$ is obtained, and for the sake of simplicity, the $T(U(D(F_1(x))))$ is also recorded as $A_1(x)$.

S215: point multiplying the first attention map and the first image feature to obtain a first point multiplication result. For example, point multiplying the $A_1(x)$ and the $F_1(x)$ to obtain $A_1(x)*F_1(x)$.

S216: point adding the first point multiplication result and the first image feature to obtain a first attention feature, i.e., point adding the $A_1(x)*F_1(x)$ and the $F_1(x)$ to obtain $(1+A_1(x))*F_1(x)$.

S217: calculating the cross entropy loss value based on the first attention feature by using the first depth neural network.

It can be seen that as for the first attention feature $(1+A_1(x))*F_1(x)$, the $A_1(x)$ may be regarded as a control gate of features in the $F_1(x)$. If the $A_1(x)$ is 0 for all positions in the $F_1(x)$, the first attention feature is an initial first image feature $F_1(x)$. If the $A_1(x)$ is not 0 for a position in the $F_1(x)$, the features in the $F_1(x)$ may be enhanced in some positions and suppressed in other positions.

Therefore, the training of the first depth neural network may be made more targeted by using the first depth neural network with the attention mechanism.

Figure 5:
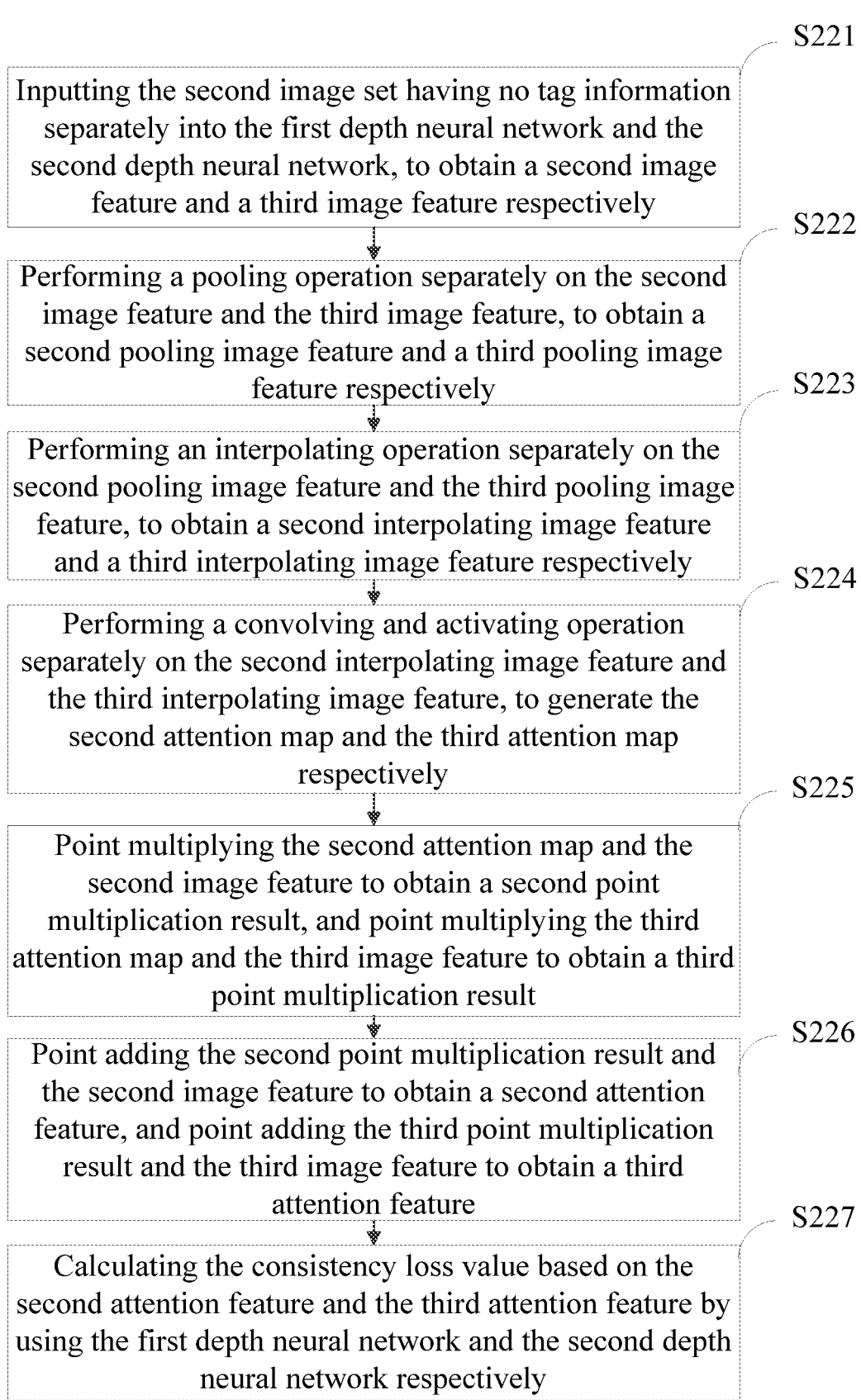
FIG. 5 illustrates a flow chart for determining a consistency loss value of a second image set by using a first depth neural network with an attention mechanism and a second depth neural network according to an embodiment of the present application.

FIG. 5 illustrates a flow chart for determining a consistency loss value of a second image set by using a first depth neural network with an attention mechanism and a second depth neural network according to an embodiment of the present application. As shown in FIG. 5, on the basis of the embodiment shown in FIG. 2 above, step S220 may include the following steps.

S221: inputting the second image set having no tag information separately into the first depth neural network and the second depth neural network, to obtain a second image feature and a third image feature respectively. For example, the second image feature and the third image feature which are obtained are recorded as $F_2(x)$ and $F_3(x)$ respectively.

S222: performing a pooling operation separately on the second image feature and the third image feature, to obtain a second pooling image feature and a third pooling image feature respectively. For example, D represents the pooling operation, such as 2×2 average pooling operation, the second pooling image feature $D(F_2(x))$ and the third pooling image feature $D(F_3(x))$ are obtained respectively.

S223: performing an interpolating operation separately on the second pooling image feature and the third pooling image feature, to obtain a second interpolation image feature and a third interpolation image feature respectively. For example, U represents the interpolating operation, such as the bilinear interpolating operation, the second interpolation image feature $U(D(F_2(x)))$ and the third interpolation image feature $U(D(F_3(x)))$ are obtained respectively.

S224: performing a convolving and activating operation separately on the second interpolation image feature and the third interpolation image feature, to generate the second attention map and the third attention map respectively. For example, T represents the convoluting and activating operation, such as the 1×1 convoluting and the sigmoid nonlinear activating operation, the second attention map $T(U(D(F_2(x))))$ and the third attention map $T(U(D(F_3(x))))$ are obtained respectively, and for the sake of simplicity, the $T(U(D(F_2(x))))$ is also recorded as $A_2(x)$, the $T(U(D(F_3(x))))$ is also recorded as $A_3(x)$.

S225: point multiplying the second attention map and the second image feature to obtain a second point multiplication result, and point multiplying the third attention map and the third image feature to obtain a third point multiplication result. For example, point multiplying the $A_2(x)$ and the $F_2(x)$ to obtain $A_2(x)*F_2(x)$, and point multiplying the $A_3(x)$ and the $F_3(x)$ to obtain $A_3(x)*F_3(x)$.

S226: point adding the second point multiplication result and the second image feature to obtain a second attention feature, and point adding the third point multiplication result and the third image feature to obtain a third attention feature, for example, point adding the $A_2(x)*F_2(x)$ and the $F_2(x)$ to obtain $(1+A_2(x))*F_2(x)$, and point adding the $A_3(x)*F_3(x)$ and the $F_3(x)$ to obtain $(1+A_3(x))*F_3(x)$.

S227: calculating the consistency loss value based on the second attention feature and the third attention feature by using the first depth neural network and the second depth neural network respectively.

Similarly, as for the second attention feature $(1+A_2(x))*F_2(x)$, $A_2(x)$ may be regarded as a control gate of features in $F_2(x)$. If the $A_2(X)$ is 0 for all positions in the $F_2(x)$, the second attention feature is an initial second image feature $F_2(x)$. If the $A_2(X)$ is not 0 for a position in the $F_2(x)$, the features in the $F_2(x)$ may be enhanced in some positions and suppressed in other positions.

Moreover, as for the third attention feature $(1+A_3(x))*F_3(x)$, $A_3(x)$ may be regarded as a control gate of features in $F_3(x)$. If $A_3(x)$ is 0 for all positions in the $F_3(x)$, the second attention feature is an initial second image feature $F_3(x)$. If the $A_3(x)$ is not 0 for a position in the $F_3(x)$, the features in the $F_3(x)$ may be enhanced in some positions and suppressed in other positions.

Therefore, by using the first depth neural network and the second depth neural network, both of which having the attention mechanism, the training of the domain adaptation between the first depth neural network and the second depth neural network can be more targeted.

Exemplary Devices

Figure 6:
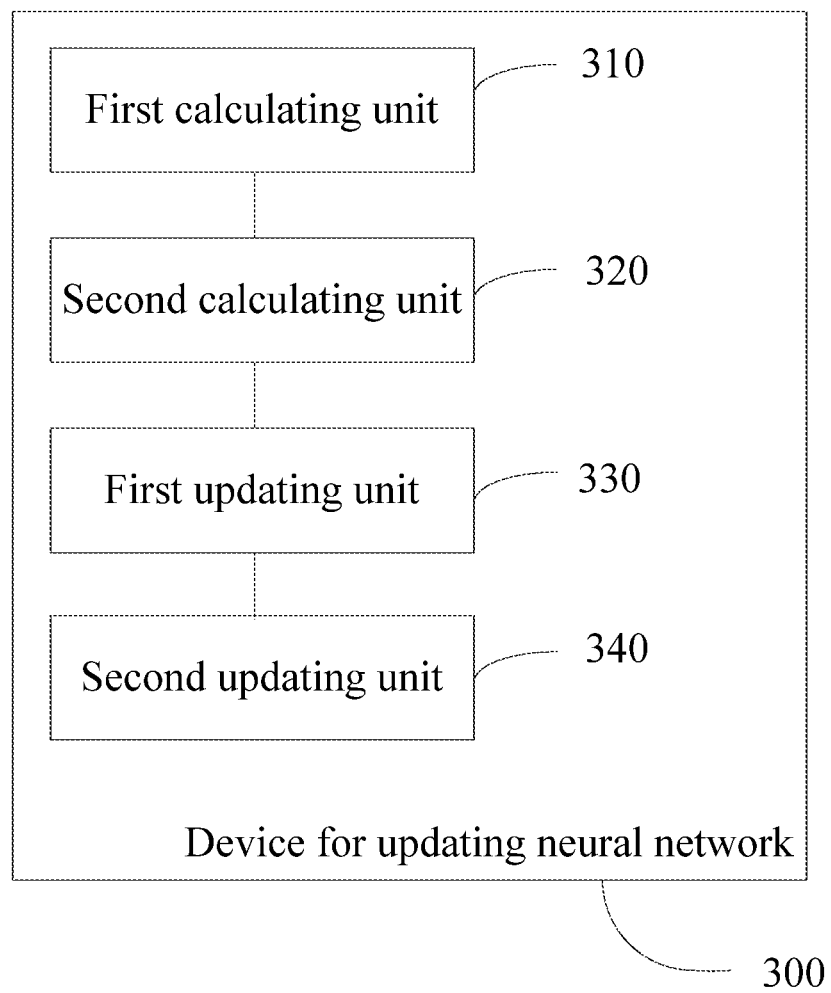
FIG. 6 illustrates a block diagram of a device for updating a neural network according to an embodiment of the present application.

FIG. 6 illustrates a block diagram of a device for updating a neural network according to an embodiment of the present application.

As shown in FIG. 6, the device 300 for updating the neural network according to the embodiment of the present application includes: a first calculating unit 310, configured to input a first image set having tag information into a first depth neural network and determine a cross entropy loss value of the first image set by using the first depth neural network; a second calculating unit 320, configured to input a second image set having no tag information separately into the first depth neural network and a second depth neural network, and determine a consistency loss value of the second image set, the first depth neural network and the second depth neural network having the same network structure; a first updating unit 330, configured to update parameters of the first depth neural network based on the cross entropy loss value determined by the first calculating unit 310 and the consistency loss value determined by the second calculating unit 320; and a second updating unit 340, configured to update parameters of the second depth neural network based on the updated parameters of the first depth neural network updated by the first updating unit 330.

In an example, in the device 300 for updating the neural network described above, the first calculating unit 310 is configured to update, by a gradient descent method, the parameters of the first depth neural network based on a weighted sum of the cross entropy loss value and the consistency loss value.

In an example, in the device 300 for updating the neural network described above, the second calculating unit 320 is configured to update, by an exponential moving average method, the parameters of the second depth neural network based on the updated parameters of the first depth neural network.

In an example, in the device 300 for updating the neural network described above, the first calculating unit 310 includes: a first feature subunit, configured to input the first image set having the tag information into the first depth neural network to obtain a first image feature; a first pooling subunit, configured to perform a pooling operation on the first image feature obtained by the first feature subunit to obtain a first pooling image feature; a first interpolating subunit, configured to perform an interpolating operation on the first pooling image feature obtained by the first pooling subunit to obtain a first interpolation image feature; and a first convoluting subunit, configured to perform a convolving and activating operation on the first interpolation image feature obtained by the first interpolating subunit to generate the first attention map; a first point multiplier subunit, configured to point multiply the first attention map obtained by the first convoluting subunit and the first image feature obtained by the first feature subunit to obtain a first point multiplication result; a first point adding subunit, configured to point add the first point multiplication result obtained by the first point multiplier subunit and the first image feature obtained by the first feature subunit to obtain a first attention feature; and a first value calculating subunit, configured to calculate the cross entropy loss value based on the first attention feature obtained by the first point multiplier subunit by using the first depth neural network.

In an example, in the device 300 for updating the neural network described above, the second calculating unit 310 includes: a second feature subunit, configured to input the second image set having no tag information separately into the first depth neural network and the second depth neural network, to obtain a second image feature and a third image feature respectively; a second pooling subunit, configured to perform a pooling operation separately on the second image feature and the third image feature obtained by the second feature subunit, to obtain a second pooling image feature and a third pooling image feature respectively; a second interpolating subunit, configured to perform an interpolating operation separately on the second pooling image feature and the third pooling image feature obtained by the second pooling subunit, to obtain a second interpolation image feature and a third interpolation image feature respectively; and a second convoluting subunit, configured to perform a convolving and activating operation separately on the second interpolation image feature and the third interpolation image feature obtained by the second interpolating subunit, to generate the second attention map and the third attention map respectively; a second point multiplier subunit, configured to point multiply the second attention map obtained by the second convoluting subunit and the second image feature obtained by the second feature subunit to obtain a second point multiplication result, and point multiply the third attention map obtained by the second convoluting subunit and the third image feature obtained by the second feature subunit to obtain a third point multiplication result; a second point adding subunit, configured to point add the second point multiplication result obtained by the second point multiplier subunit and the second image feature obtained by the second feature subunit to obtain a second attention feature, and point add the third point multiplication result obtained by the second point multiplier subunit and the third image feature obtained by the second feature subunit to obtain a third attention feature; and a second value calculating subunit, configured to calculate the consistency loss based on the second attention feature and the third attention feature obtained by the second point multiplier subunit by using the first depth neural network and the second depth neural network.

Herein, those skilled in the art may understand that the specific functions and operations of each unit and module in the above-described device 300 for updating the neural network have been described in detail in the above description of the method for updating the neural network with reference to FIG. 1 to FIG. 5. Therefore, a repeated description thereof is omitted.

As described above, the device 300 for updating the neural network according to the embodiments of the present application may be implemented in various terminal devices, such as servers for updating the neural network, etc. In one example, the device 300 for updating the neural network according to the embodiments of the present application may be integrated into the terminal device as a software module and/or a hardware module. For example, the device 300 for updating the neural network may be a software module in an operating system of the terminal device, or may be an application program developed for the terminal device; of course, the device 300 for updating the neural network may also be one of the numerous hardware modules of the terminal device.

Alternatively, in another example, the device 300 for updating the neural network and the terminal device may also be separate devices, and the device 300 for updating the neural network may be connected to the terminal device through a wired network and/or a wireless network, and interactive information is transmitted in accordance with an agreed data format.

Exemplary Electronic Devices

Hereinafter, the electronic device according to the embodiments of the present application will be described with reference to FIG. 7.

Figure 7:
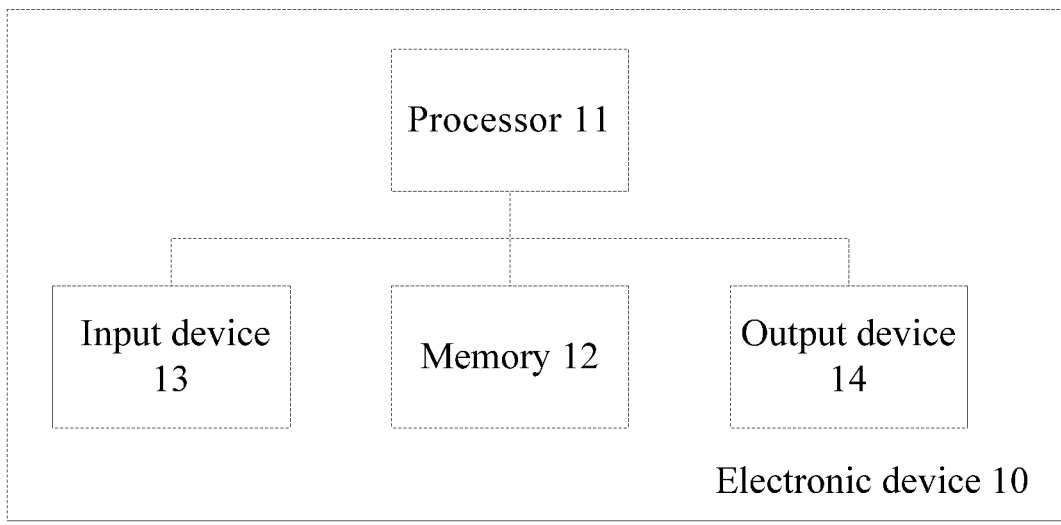
FIG. 7 illustrates a block diagram of an electronic device according to an embodiment of the present application.

FIG. 7 illustrates a block diagram of an electronic device according to an embodiment of the present application.

As shown in FIG. 7, the electronic device 10 includes one or more processors 11 and a memory 12.

The processor 11 may be a central processing unit (CPU) or other form of processing unit having data processing capabilities and/or instruction execution capabilities, and may control other components in the electronic device 10 to perform desired functions.

The memory 12 may include one or more computer program products, which may include various forms of computer readable storage medium, such as a volatile memory and/or a nonvolatile memory. The volatile memory may include, for example, a random-access memory (RAM) and/or a cache or the like. The nonvolatile memory may include, for example, a read only memory (ROM), a hard disk, a flash memory, or the like. One or more computer program instructions may be stored on the computer readable storage medium, and the processor 11 may execute the program instructions to implement the method for updating the neural network in various embodiments of the present application described above and/or other desired functions. Various contents such as cross entropy loss values, consistency loss values, and the like may also be stored in the computer readable storage medium.

In one example, the electronic device 10 may also include an input device 13 and an output device 14 that are interconnected by a bus system and/or other form of connection mechanisms (not shown).

The input device 13 may include, for example, a keyboard, a mouse, and the like.

The output device 14 may output various information to the outside, including an updated neural network, a result of image semantic segmentation of the image, and the like. The output device 14 may include, for example, a display, a speaker, a printer, a communication network, remote output devices to which the output device 14 is connected, and the like.

Of course, for simplicity, only some of the components of the electronic device 10 related to the present application are shown in FIG. 7, and components such as a bus, an input/output interface and the like are omitted. In addition, the electronic device 10 may also include any other suitable components depending on a particular application.

Exemplary Computer Program Products and Computer Readable Storage Media

In addition to the method and the device described above, embodiments of the present application may also be a computer program product including computer program instructions, and when the computer program instruction is executed by the processor, the processor performs the steps in the method for updating the neural network according to various embodiments of the present application described in the "Exemplary Methods" section of the present specification.

The computer program product may write a program code for performing the operations of the embodiments of the present application in any combination of one or more programming languages, the programming language includes object-oriented programming languages, such as Java, C++, etc., and also includes conventional procedural programming languages, such as "C" language or similar programming languages. The program code may be executed completely on a computing device of the user, partially on a device of the user, as an independent software package, partially on the computing device of the user and partially on a remote computing device, or completely on the remote computing device or on a server.

In addition, the embodiments of the present application may also be a computer readable storage media, on which computer program instructions are stored, and when the computer program instructions are executed by the processor, the processor performs the steps in the method for updating the neural network according to various embodiments of the present application described in the "Exemplary Methods" section of the present specification.

The computer readable storage media may adopt any combination of one or more readable media. The readable media may be a readable signal media or a readable storage media. The readable storage media may include, for example, but is not limited to, electric, magnetic, optical, electromagnetic, infrared, or systems, apparatuses or components of a semiconductor, or any combination of the above. More specific examples (a non-exhaustive list) of the readable storage media include: an electrical connection with one or more wires, a portable disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

The basic principles of the present application have been described above in connection with specific embodiments. However, it should be noted that the advantages, effects, and the like, which are referred to in the present application, are only examples but not limitations, and it cannot be considered that these advantages, effects, etc., are necessary for various embodiments of the present application. In addition, the specific details disclosed above are only for purposes of the examples and easy to understand, but not for limitations. The above details do not limit that the present application must be realized with the above specific details.

The block diagrams of the components, apparatuses, devices and systems involved in the present application are only illustrative examples and are not intended to require or imply that the connection, arrangement and configuration must be carried out in the manners shown in the block diagrams. As will be realized by those skilled in the art, these components, apparatuses, devices and systems may be connected, arranged and configured in any way. Words such as "include", "comprise", "have" and so on are open words, which refer to "including but not limited to" and may be used interchangeably with each other. Words of "or" and "and" used here refer to the words of "and/or" and may be used interchangeably with each other, unless the context clearly indicates otherwise. The terms "such as" used herein refers to the phrases "such as but not limited to" and may be used interchangeably with each other.

It should also be noted that in the apparatuses, devices and methods of the present application, the various components or steps may be decomposed and/or recombined. These decompositions and/or recombination shall be considered as equivalent to the present application.

The above description of the disclosed aspects is provided to enable any person skilled in the art to make or use the present application. Various modifications to these aspects are apparent to those skilled in the art, and the general principles defined herein may be applied to other aspects without departing from the scope of the present application. Therefore, the present application is not intended to be limited to the aspects shown herein, but in accordance with the widest range consistent with the principles and novel features disclosed herein.

The above description has been given for the purposes of illustration and description. Furthermore, the description is not intended to limit the embodiments of the present application to the form disclosed herein. Although a plurality of exemplary aspects and embodiments have been discussed above, those skilled in the art will recognize certain variations, modifications, changes, additions and sub combinations thereof.

What is claimed is:

1. A method for updating a neural network, comprising:
   inputting a first image set having tag information into a first depth neural network and determining a cross entropy loss value of the first image set by using the first depth neural network;
   inputting a second image set having no tag information separately into the first depth neural network and a second depth neural network and determining a consistency loss value of the second image set, the first depth neural network and the second depth neural network having a same network structure;
   updating parameters of the first depth neural network based on the cross entropy loss value and the consistency loss value; and
   updating parameters of the second depth neural network based on the updated parameters of the first depth neural network.

2. The method for updating a neural network of claim 1, wherein the updating parameters of the first depth neural network based on the cross entropy loss value and the consistency loss value comprises:
   updating, by a gradient descent method, the parameters of the first depth neural network based on a weighted sum of the cross entropy loss value and the consistency loss value.

3. The method for updating a neural network of claim 1, wherein the updating parameters of the second depth neural network based on the updated parameters of the first depth neural network comprises:
   updating, by an exponential moving average method, the parameters of the second depth neural network based on the updated parameters of the first depth neural network.

4. The method for updating a neural network of claim 1, wherein the inputting a first image set having tag information into a first depth neural network and determining a cross entropy loss value of the first image set by using the first depth neural network comprises:
   inputting the first image set having the tag information into the first depth neural network to obtain a first image feature;
   generating a first attention map based on the first image feature;
   point multiplying the first attention map and the first image feature to obtain a first point multiplication result;
   point adding the first point multiplication result and the first image feature to obtain a first attention feature; and
   calculating the cross entropy loss value based on the first attention feature by using the first depth neural network.

5. The method for updating a neural network of claim 4, wherein the generating a first attention map based on the first image feature comprises:
   performing a pooling operation on the first image feature to obtain a first pooling image feature;
   performing an interpolating operation on the first pooling image feature to obtain a first interpolation image feature; and
   performing a convolving and activating operation on the first interpolation image feature to generate the first attention map.

6. The method for updating a neural network of claim 1, wherein the inputting a second image set having no tag information separately into the first depth neural network and a second depth neural network and determining a consistency loss value of the second image set comprises:
   inputting the second image set having no tag information separately into the first depth neural network and the second depth neural network, to obtain a second image feature and a third image feature respectively;
   generating a second attention map and a third attention map based on the second image feature and the third image feature respectively;
   point multiplying the second attention map and the second image feature to obtain a second point multiplication result, and point multiplying the third attention map and the third image feature to obtain a third point multiplication result;
   point adding the second point multiplication result and the second image feature to obtain a second attention feature, and point adding the third point multiplication result and the third image feature to obtain a third attention feature; and calculating the consistency loss value based on the second attention feature and the third attention feature by using the first depth neural network and the second depth neural network.

7. The method for updating a neural network of claim 6, wherein the generating a second attention map and a third attention map based on the second image feature and the third image feature respectively comprises:

performing a pooling operation separately on the second image feature and the third image feature, to obtain a second pooling image feature and a third pooling image feature respectively;

performing an interpolating operation separately on the second pooling image feature and the third pooling image feature, to obtain a second interpolation image feature and a third interpolation image feature respectively; and performing a convolving and activating operation separately on the second interpolation image feature and the third interpolation image feature, to generate the second attention map and the third attention map respectively.

8. The method for updating a neural network of claim 1, further comprising:

determining whether the updated parameters of the second depth neural network are converged with respect to the parameters of the second depth neural network before being updated; and if the updated parameters of the second depth neural network are converged with respect to the parameters of the second depth neural network before being updated, setting an image semantic segmentation model by using the second depth neural network which has been updated.

9. The method for updating a neural network of claim 1, wherein before inputting the first image set into the first depth neural network and inputting the second image set separately into the first depth neural network and the second depth neural network, the method further comprises:

randomly augmenting each image in the first image set and the second image set.

10. The method for updating a neural network of claim 9, wherein the randomly augmenting each image in the first image set and the second image set comprises:

adding Gaussian noise with a mean value of 0 and a standard deviation of 0.1 to each pixel of each image in the first image set and the second image set.

11. An electronic device, comprising:

a processor; and a memory on which a computer program instruction is stored, wherein when the computer program instruction is executed by the processor, the processor performs the following steps:

inputting a first image set having tag information into a first depth neural network, and determining a cross entropy loss value of the first image set by using the first depth neural network;

inputting a second image set having no tag information separately into the first depth neural network and a second depth neural network, and determining a consistency loss value of the second image set, the first depth neural network and the second depth neural network having a same network structure;

updating parameters of the first depth neural network based on the cross entropy loss value and the consistency loss value; and updating parameters of the second depth neural network based on the updated parameters of the first depth neural network.

12. The electronic device of claim 11, wherein the updating parameters of the first depth neural network based on the cross entropy loss value and the consistency loss value comprises:

updating, by a gradient descent method, the parameters of the first depth neural network based on a weighted sum of the cross entropy loss value and the consistency loss value.

13. The electronic device of claim 11, wherein the updating parameters of the second depth neural network based on the updated parameters of the first depth neural network comprises:

updating, by an exponential moving average method, the parameters of the second depth neural network based on the updated parameters of the first depth neural network.

14. The electronic device of claim 11, wherein the inputting a first image set having tag information into a first depth neural network and determining a cross entropy loss value of the first image set by using the first depth neural network comprises:

inputting the first image set having the tag information into the first depth neural network to obtain a first image feature;

generating a first attention map based on the first image feature;

point multiplying the first attention map and the first image feature to obtain a first point multiplication result;

point adding the first point multiplication result and the first image feature to obtain a first attention feature; and calculating the cross entropy loss value based on the first attention feature by using the first depth neural network.

15. The electronic device of claim 14, wherein the generating a first attention map based on the first image feature comprises:

performing a pooling operation on the first image feature to obtain a first pooling image feature;

performing an interpolating operation on the first pooling image feature to obtain a first interpolation image feature; and performing a convolving and activating operation on the first interpolation image feature to generate the first attention map.

16. The electronic device of claim 11, wherein the inputting a second image set having no tag information separately into the first depth neural network and a second depth neural network and determining a consistency loss value of the second image set comprises:

inputting the second image set having no tag information separately into the first depth neural network and the second depth neural network, to obtain a second image feature and a third image feature respectively;

generating a second attention map and a third attention map based on the second image feature and the third image feature respectively;

point multiplying the second attention map and the second image feature to obtain a second point multiplication result, and point multiplying the third attention map and the third image feature to obtain a third point multiplication result;

point adding the second point multiplication result and the second image feature to obtain a second attention feature, and point adding the third point multiplication result and the third image feature to obtain a third attention feature; and calculating the consistency loss value based on the second attention feature and the third attention feature by using the first depth neural network and the second depth neural network.

17. The electronic device of claim 16, wherein the generating a second attention map and a third attention map based on the second image feature and the third image feature respectively comprises:

performing a pooling operation separately on the second image feature and the third image feature, to obtain a second pooling image feature and a third pooling image feature respectively;

performing an interpolating operation separately on the second pooling image feature and the third pooling image feature, to obtain a second interpolation image feature and a third interpolation image feature respectively; and performing a convolving and activating operation separately on the second interpolation image feature and the third interpolation image feature, to generate the second attention map and the third attention map respectively.

18. The electronic device of claim 11, wherein when the computer program instruction is executed by the processor, the processor further performs the following steps:

determining whether the updated parameters of the second depth neural network are converged with respect to the parameters of the second depth neural network before being updated; and if the updated parameters of the second depth neural network are converged with respect to the parameters of the second depth neural network before being updated, setting an image semantic segmentation model by using the second depth neural network which has been updated.

19. The electronic device of claim 11, wherein when the computer program instruction is executed by the processor, the processor further performs the following steps:

before inputting the first image set into the first depth neural network and inputting the second image set separately into the first depth neural network and the second depth neural network, randomly augmenting each image in the first image set and the second image set.

20. A non-transitory computer-readable media on which a computer program instruction is stored, wherein when the computer program is executed by a processor, the processor performs the following steps:

inputting a first image set having tag information into a first depth neural network, and determining a cross entropy loss value of the first image set by using the first depth neural network;

inputting a second image set having no tag information separately into the first depth neural network and a second depth neural network, and determining a consistency loss value of the second image set, the first depth neural network and the second depth neural network having the same network structure;

updating parameters of the first depth neural network based on the cross entropy loss value and the consistency loss value; and updating parameters of the second depth neural network based on the updated parameters of the first depth neural network.

* * * * *